June 20, 1961  M. A. WEISS ET AL  2,989,380
APPARATUS FOR CARRYING OUT CHEMICAL REACTIONS
Filed Nov. 24, 1953  3 Sheets-Sheet 1

MALCOLM A. WEISS INVENTORS
JOHN P. LONGWELL
BY George J. Silhavy ATTORNEY

June 20, 1961  M. A. WEISS ET AL  2,989,380
APPARATUS FOR CARRYING OUT CHEMICAL REACTIONS
Filed Nov. 24, 1953  3 Sheets-Sheet 2

MALCOLM A. WEISS INVENTORS
JOHN P. LONGWELL
BY  ATTORNEY

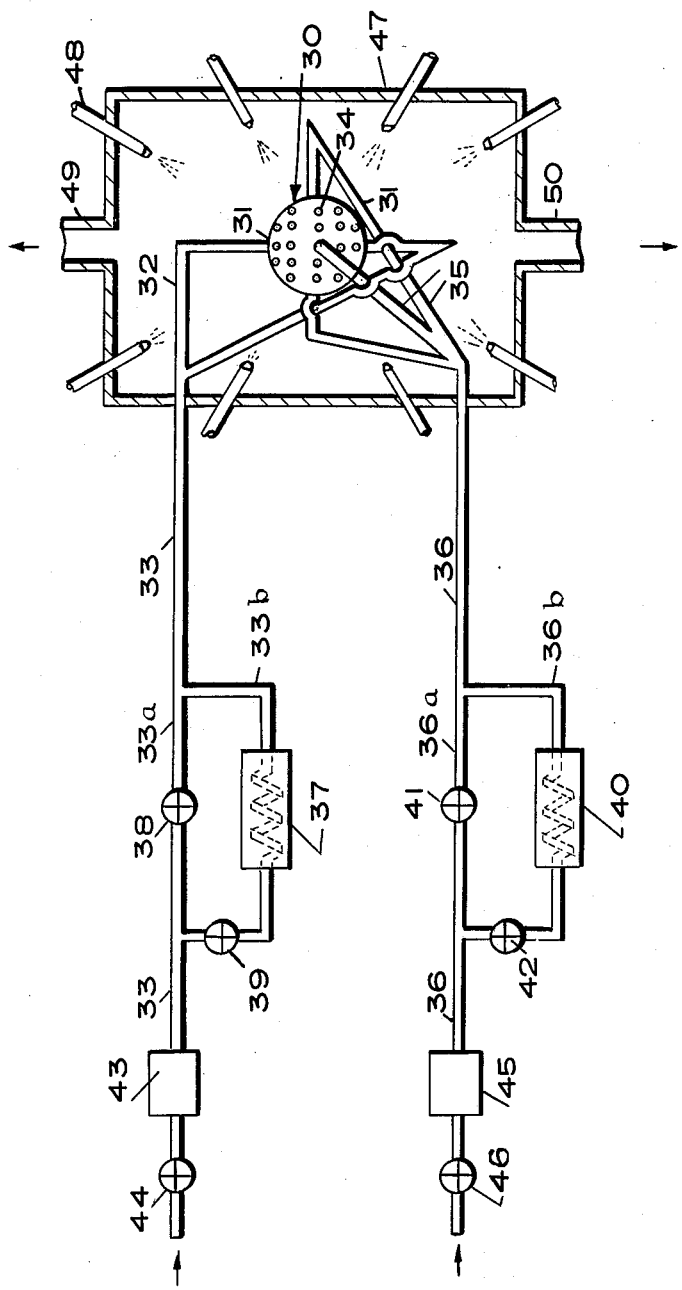

United States Patent Office 2,989,380
Patented June 20, 1961

2,989,380
APPARATUS FOR CARRYING OUT CHEMICAL REACTIONS
Malcolm A. Weiss, North Bergen, and John P. Longwell, Scotch Plains, N.J., assignors to Esso Research and Engineering Company, a corporation of Delaware
Filed Nov. 24, 1953, Ser. No. 394,070
12 Claims. (Cl. 23—277)

This invention relates to a method and apparatus adapted for carrying out chemical reactions and more particularly it relates to apparatus adapted for carrying out such reactions at a rapid rate and under conditions which provide a controlled reaction time.

Briefly, the apparatus of the present invention comprises a hollow spherical housing having a plurality of preferably symmetrically spaced outlets in the wall thereof and inlet means for introducing and uniformly distributing fluids into the interior thereof. The housing's spherical interior provides a reaction zone with the reactants entering the reaction zone through the inlet means and the reaction products leaving the reaction zone through the outlets in the wall of the housing. Although there are a number of different forms of the present invention, each form is characterized by its effectiveness in producing thorough and rapid mixing of the reactants in the reaction zone. Because of this desirable characteristic, the apparatus of the present invention has application in many chemical reactions, and especially in exothermic reactions. It is particularly effective as a combustor due to the almost instantaneous combination of fuel and oxygen which is effected at the temperature existing in the reaction zone.

The apparatus of the present invention is also ideally suited for carrying out chemical reactions in which it is important to bring reactants rapidly to the temperature of reaction and, in addition, important to accurately control the residence time of the reactants in the reaction zone so as to obtain desired products.

The use of combustors in the industrial field is extensive. Much research and development has been conducted in the fields of gasoline and diesel engines, gas and coal furnaces, oil burners, etc., in order to improve their operating efficiency. However, despite this extensive experimentation a maximum heat release rate of only about 0.02–5 millions of B.t.u./hr./ft.$^3$ of combustion volume/atm.$^2$ has been obtained commercially with these types of combustors. Recently small experimental ramjets have been constructed which effect a maximum heat release rate of about 30 millions of B.t.u./hr./ft.$^3$ of combustion volume/atm.$^2$. In contrast to these prior art devices, the apparatus of the present invention, when employed as a combustor, is able to effect a maximum heat release at the rate of about 400 millions of B.t.u./hr./ft.$^3$ of combustion volume/atm.$^2$.

The rate of combusion is dependent upon two factors. The first factor is the time involved in the preparation of the mixture for combustion, and the second factor is the "ultimate space rate of combustion." Included in the mixture preparation time are the times required (1) to vaporize the fuel; (2) to mix the vaporized fuel with air in proper proportions, and (3) to raise the mixture temperature to some ignition point. By "ultimate space rate of combustion" is mean that rate at which fuel and air can be combined as limited only by the chemical kinetics of combustion.

In conventional industrial combustion equipment, such as furnaces and engines, mixture-preparation time limits the rate of combustion. In these cases, the ultimate chemical reaction time is extremely small as compared to the mixture preparation time. However, in the case of the present invention, due to the geometry of the present apparatus, and the resultant highly efficient turbulent mixing accomplished within the interior of the present apparatus, extremely short combustion times of the order of $10^{-4}$ sec. have been obtained when employing the present apparatus as a combustor. Thus, with the present apparatus, mixture preparation time for combustion is substantially shorter than that of the prior art devices. To accomplish this the fuel to be burned is initially vaporized, if a liquid fuel is employed, and then mixed with a proper proportion of air prior to its introduction into the interior of the present combustor. The fuel-air mixture may be preheated if desired. The premixed fuel and air are then introduced and uniformly distributed into the combustion zone in the interior of the present combustor, with the products of combustion leaving the interior of the present combustor by means of a plurality of preferably symmetrically spaced outlets in the wall thereof. In addition to the prevaporization of the fuel and the premixing of the fuel with air, the highly efficient and intimate turbulent mixing of the fuel-air mixture with the hot gases in the combustion zone substantially decreases the time required to raise the mixture to the ignition temperature.

The extremely high rate of combustion obtained with the present combustor as compared to conventional combustors means that a combustor made in accordance with the present invention will be much smaller and more compact than conventional combustion apparatus. In addition, the present combustor may be employed in a manner such that it will provide extremely efficient heat exchange with a fluid. For example, the present combustor may be employed as a submerged combustor in such industrial operations as the concentration of pickling liquors, sulfuric acid, etc. This is accomplished by submerging the combustor after ignition beneath the surface of the liquor which is to be concentrated by evaporation. In this specific application of the present invention excellent heat transfer will be effected because of the direct contact between the hot burned gases passing from the interior of the spherical housing through the outlets in the wall thereof and into the liquor which is being evaporated.

As previously stated, the apparatus of the present invention also finds useful application in chemical reactions in which it is necessary to accurately control the residence time of reactants in the reaction zone so as to obtain certain desired products. One example of such a process is the partial oxidation of hydrocarbons for chemical production, such as the combination of methane and oxygen to produce acetylene. In this case, oxygen, (preheated, if desired) enters several inlets and methane (preheated, if desired) enters several other inlets symmetrically spaced in the wall of the spherical reactor made in accordance with the present invention. The interior of the spherical reactor provides a reaction zone. The reaction products leave the reaction zone by means of a multiplicity of outlets preferably symmetrically spaced in the wall of the spherical reactor and are then immediately quenched by means, such as water sprays, to stop further chemical reaction. The relative mass flows of the reactants are regulated so as to give the optimum oxygen to hydrocarbon ratio and the total mass flow is adjusted to effect a predetermined contact or residence time in the particular size reactor employed. In a similar manner a chemical reaction using any number of components can be carried out by introducing the components in separate inlets to the spherical reactor of the present invention. With this type of chemical reactor there can be no pre-contact of any two reactants and when contact does occur in the interior of the reactor, extremely rapid and thorough mixing of all components occurs.

Another specific application of this type of chemical reactor is its utilization for high temperature, short contact time hydrocarbon conversion. In this application a preheated inert gas enters several inlets and a hydrocarbon vapor at a temperature below its cracking temperature enters several other inlets in the wall of the spherical reactor. The hydrocarbon vapors are vigorously and almost instantaneously mixed with the hot inert gas, thus reaching the cracking temperature very rapidly. In this way the preliminary cracking usually encountered during the process of bringing the hydrocarbon up to optimum cracking temperature is eliminated. The temperatures and flow rates of the hydrocarbon and inert gas are selected to give the desired cracking temperature and contact time. The products of the cracking reaction are discharged through a multiplicity of preferably symmetrically spaced outlets in the wall of the reactor into a cool surrounding medium where they are immediately quenched. Residence time of the hydrocarbons in the reaction zone in the interior of the spherical reactor can thus be adjusted to any period of time from micro seconds to seconds. The spherical reactor is sufficiently versatile so that any condition of residence time and temperature in the reaction zone may be effected and accurately predetermined. Although gas phase operation has been implied, the reactor is also suitable for liquid phase use or with entrained solids or with any combination of phases.

An object of the present invention is to provide a compact apparatus for carrying out combustion at a rapid rate.

Another object of the present invention is to provide a compact apparatus for combustion which will effect an efficient heat exchange between the combustion gases and a fluid to be heated.

A further object of the present invention is to provide apparatus for carrying out chemical reactions in which the time and temperature of reaction can be accurately adjusted so as to thereby control the extent of the chemical reaction in order to obtain desired products.

Further objects of the present invention will be apparent from a reading of the present specification.

The apparatus of the present invention and its application may be readily understood with reference to the drawings in which:

FIG. 5 is a diagrammatic showing of apparatus made in accordance with the present invention adapted for conducting chemical reactions under controlled conditions of temperature and residence time with parts broken away to facilitate the disclosure.

Figure 2:
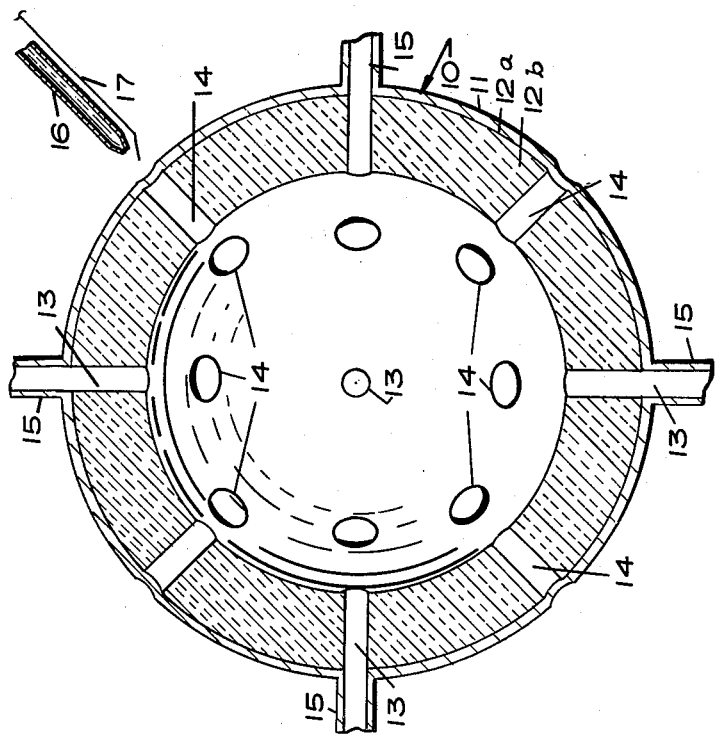
FIG. 2 is a vertical cross sectional view of the combustion apparatus of FIG. 1 taken along the line 2—2 of FIG. 1.
Figure 1:
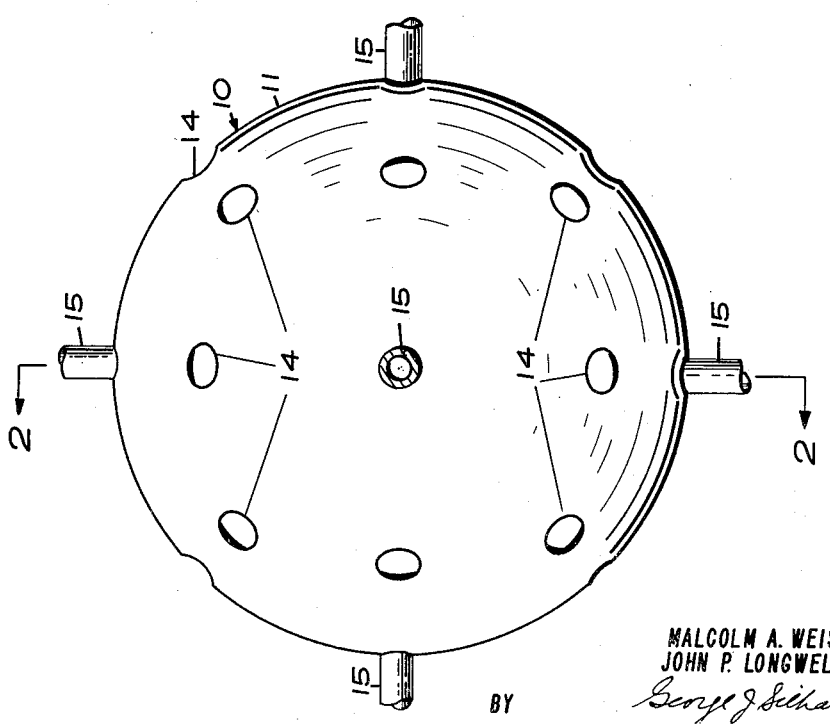
FIG. 1 is a front plan view of one form of combustion apparatus made in accordance with the present invention.

Referring now to the drawings, reference character 10 of FIGS. 1 and 2 represents one form of combustor made in accordance with the present invention. Reference character 11 designates a hollow spherical housing, the interior of which provides a combustion zone. In this specific embodiment of the present invention, housing 11 comprises in actuality two separate shells, namely, an outer shell 12a and an inner shell 12b. Shell 12a is metallic, being made of carbon steel if its temperature in operation does not exceed about 1000° F. and if the materials of the reaction are non-corrosive. For higher temperatures and/or corrosive conditions, shell 12a should be made of a high melting point metal or alloy such as nickel, chromium, molybdenum, stainless steel, etc. Metallic shell 12a encloses shell 12b which is made of a ceramic insulating material. Each shell performs a definite function in the operation of combustor 10. Metallic shell 12a provides mechanical strength to the combustor and also provides a convenient means for mounting various sphere connections which will presently be discussed in detail. Metallic shell 12a must be constructed of a metal which is capable of withstanding operating temperatures of at least about 1000–2000° F. Nickel is the preferred shell material. If combustor 10 is constructed without insulating shell 12b and only metallic shell 12a is employed, it is necessary to make shell 12a of a metal or alloy capable of withstanding a temperature of about 2000–3000° F. However, it is preferable to employ a combination of metallic shell 12a and insulating shell 12b.

Insulating shell 12b provides a means of maintaining the temperature of metallic shell 12a at a temperature substantially lower than that which exists in the combustion zone in the center of insulating shell 21b. In addition, insulating shell 12b also provides a means of maintaining a high temperature in the combustion zone in the interior of housing 11 by reducing the heat losses through the wall of housing 11. This is important as the rate of heat release in the combustion zone is dependent upon the temperature of that zone. Insulating shell 12b is constructed by carving two hemispherical shells from a high temperature insulating fire brick which are subsequently assembled within the metal shell 12a to effectively produce a spherical insulating shell. Insulating shell 12b should be constructed of a material able to withstand temperatures exceeding 3000° F. under both oxidizing (lean fuel/air mixtures) and reducing (rich fuel/air mixture) conditions. At the same time the material should have a low thermal conductivity, should possess resistance to severe thermal shock which occurs when combustor 10 is ignited or extinguished, and should be able to be worked into the required spherical shape and still possess reasonable mechanical strength. Such insulating material as stabilized zirconia brick, kaolin brick, alumina brick, etc. may be employed for this purpose.

Housing 11 is provided with a multiplicity of symmetrically spaced circular inlets 13 through which a fuel which has been prevaporized and premixed in the proper proportions with an oxygen-containing gas is introduced into the combustion zone in the interior thereof. Each of inlets 13 of housing 10 is aligned along a separate radius of housing 11. In this particular form of the present invention, six inlets are employed. It is to be understood, however, that the present invention is not limited to this particular number of inlets. Housing 11 is also provided with a multiplicity of preferably symmetrically spaced outlets 14 in the wall thereof to provide a means of withdrawing the products of combustion from the interior thereof. In this specific embodiment of the present invention housing 11 is provided with twenty such outlets. It is to be understood, however, that the present invention is not limited to this particular number of outlets. Connected to metal shell 12a are six inlet conduits 15 which communicate with the interior of housing 11 by means of inlets 13. In this particular embodiment of the present invention, the six inlet conduits 15 are arranged at 90° apart around housing 11. Jet 16 and spark device 17 are provided for igniting the combustor when initially placing combustor 10 in operation which will presently be discussed in greater detail.

In operation of combustor 10 the fuel to be burned is vaporized, if a liquid fuel is employed, and then mixed in proper proportions with an oxygen-containing gas (by means not shown) prior to its introduction to combustor 10. In this way the mixture preparation time is considerably reduced. Stoichiometrically about 15 lbs. of air/lb. of fuel in the case of usual hydrocarbon fuels is required and the maximum rate of heat release is obtained at the stoichiometric ratio. The fuel-air mixture, which may be preheated, is then uniformly distributed to inlet conduits 15 from whence the fuel air mixture enters inlets 13. Inlets 13 provide high velocity jets of the fuel-air mixture which penerate into and are vigorously mixed with the burning gases in the interior of housing 11. Thus the incoming fuel-air mixture loses its identity very rapidly on entering the combustion zone and almost instantaneously heats up to combustion temperature by direct heat transfer with the burning gases. Ideally, of course, the incoming mixture should be mixed instantaneously with the sphere contents so that completely homogeneous conditions of temperature and composition exist in the reaction zone. What is desired then is a perfectly stirred and insulated combustor with the stirring accomplished by incoming jets rather than by a mechanical device. The rate of combustion in the perfectly stirred combustor would be limited only by the ultimate reaction rate of combustion. The stirring requirements of an actual combustor which approaches the perfectly stirred combustor is therefore quite severe since this mixing time must be very short, compared to the ultimate reaction time, and the reaction time for combustion is in itself extremely short. The present invention represents a substantial step forward in approaching the perfectly stirred reactor as is evidenced by the rate of heat release of the present apparatus as compared to prior art devices.

Initial ignition of the fuel-air mixture in combustor 10 is accomplished by passing a stream of hydrogen gas through jet 16 and igniting this stream of hydrogen by means of spark device 17. The resultant burning of jet hydrogen is then introduced through one of outlets 14 to thereby ignite the fuel and air mixture in the interior of housing 11. The hot gaseous products of combustion leave the combustion zone in the interior of housing 11 through outlets 14.

When utilizing this particular form of the present invention as a submerged combustor in an evaporation process, the fuel-air mixture is ignited by ignition means, such as the burning jet of hydrogen gas previously mentioned, and the ignited combustor is then submerged beneath the surface of the liquid being evaporated or concentrated. The hot gaseous products of combustion exiting from the interior of housing 11 by means of outlets 14 bubble up through the liquid which is being evaporated. The present invention in this particular application provides a compact combustor which produces a high rate of heat release in addition to effecting an intimate contact between the liquid being concentrated by evaporation and the hot gaseous combustion products.

Although this particular form of the invention is provided with six inlets and twenty outlets, the present invention is not restricted to this particular number of inlets and outlets. The best stirring and homogeneity occur when as large a number of inlet holes as practicable is employed. In actuality, however, the number of inlets cannot be increased indefinitely because of the mechanical difficulty involved in attaching their feeding inlet conduits. The size of the inlets depends on the allowable entrance pressure drop. It is also preferable to employ a large number of outlets, although mixing is less sensitive to the number of outlets than to the number of inlets. The size and number of outlets is chosen to produce a pressure drop of at least a few inches of water, so as to uniformly exhaust the products of combustion through all the exits. The inlets which are preferably circular are arranged symmetrically in housing 11 to prevent gross circulation patterns, with resulting heterogeneities in the interior of housing 11. The outlets in housing 11 need not be symmetrically spaced in the housing wall, although it is preferable that they be so spaced. Housing 11 of the present invention is not restricted to any particular diameter, so that practical and commercial considerations will therefore dictate the diameter employed. The sum of the areas of the inlet and outlet openings in the interior wall of housing 11 should represent about 2–50% of the peripheral area of the combustion zone in the interior of housing 11 with the sum of the areas of the inlet openings being about 1–50% of the sum of the areas of the outlet openings.

Such a combustor as described above was constructed with a housing having an internal diameter of 1.5″ which thereby provided a reaction zone volume of 0.00102 ft.$^3$. The outer metallic shell was made of $\frac{1}{16}$″ thick nickel and had an outside diameter of about 5″. The inner insulating shell was made from zirconia brick to provide an insulation thickness of 1¾″ and a combustion zone diameter of 1.5″. Six inlets having a diameter of 0.085″ and twenty outlets having a diameter of 0.156″ were provided in the housing wall with the inlets connecting to nickel inlet conduits of the same diameter. The fuel employed was iso octane having a fuel net heating value of about 19,000 B.t.u./lb. and its rate of introduction to the combustor was measured by means of a fuel rotameter. Air was employed as the oxygen containing gas for the combustion reaction and its rate of introduction to the combustor was measured by means of an air metering orifice. The air and fuel were mixed and heated to about 200° F. in an electrically heated conduit and then introduced to the interior of the combustor uniformly through the six inlets. Hydrogen, lit by a spark, was then jetted into the combustor through an outlet in the wall of the housing until the fuel-air mixture ignited. The combustor itself was enclosed in a sealed 10″ pipe enclosure. This pipe enclosure was provided with an exhaust port which connected to steam ejectors so that any desired pressure could be maintained in the zone surrounding the combustor to thereby maintain the pressure in the combustion zone in the interior of the combustor at any given desired pressure. The pipe enclosure was also provided with sight glasses so that combustion could be observed by looking through the outlets in the spherical housing. Two pressure taps were provided in the wall of the spherical housing to measure the pressure in the combustion zone in the interior of the spherical housing.

In this particular experiment 4.95 lbs. of fuel/hr. were premixed with 89 lbs of air/hr. and the mixture fed to the combustor. A temperature of about 3000° F. in the combustion zone was observed by means of an optical pyrometer. Analysis of the combustion gases indicated that 88% or 4.45 lbs. of fuel/hr. were burned. The heat release from the particular combustor employed was therefore 84,500 B.t.u./hr. which was equivalent to 185 millions of B.t.u./ft.$^3$ of combustion volume/hr./atm.$^2$ as the pressure in the combustor was 0.668 absolute atmosphere. In another experiment with the same combustor 2.19 lbs. of isooctane fuel/hr. were premixed with 34.8 lbs. of air/hr. and the mixture fed similarly to the combustor. 82% of the fuel, or 1.80 lbs./hr., was burned which resulted in a heat release of 34,200 B.t.u./hr. As the pressure in the interior of the combustor was 0.338 absolute atmosphere, the rate of heat release was 293 millions of B.t.u./ft.$^3$ of combustion volume/hr./atm.$^2$. In the above two experiments an exact stoichiometric ratio of air to fuel was not employed. However, by employing an exact stoichiometric ratio, the rate of heat release would be expected to be about 400 millions of B.t.u./ft.$^3$ of combustion volume/hr./atm.$^2$ with this type of combustor based on the above experiments.

Figure 4:
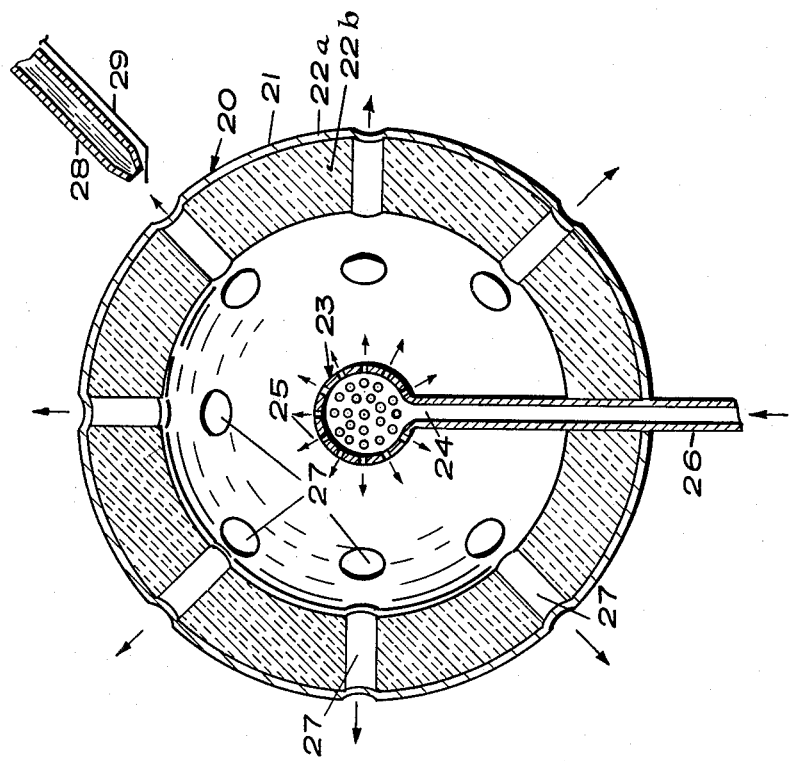
FIG. 4 is a vertical cross sectional view of the combustion apparatus of FIG. 3 taken along line 4—4 of FIG. 3.
Figure 3:
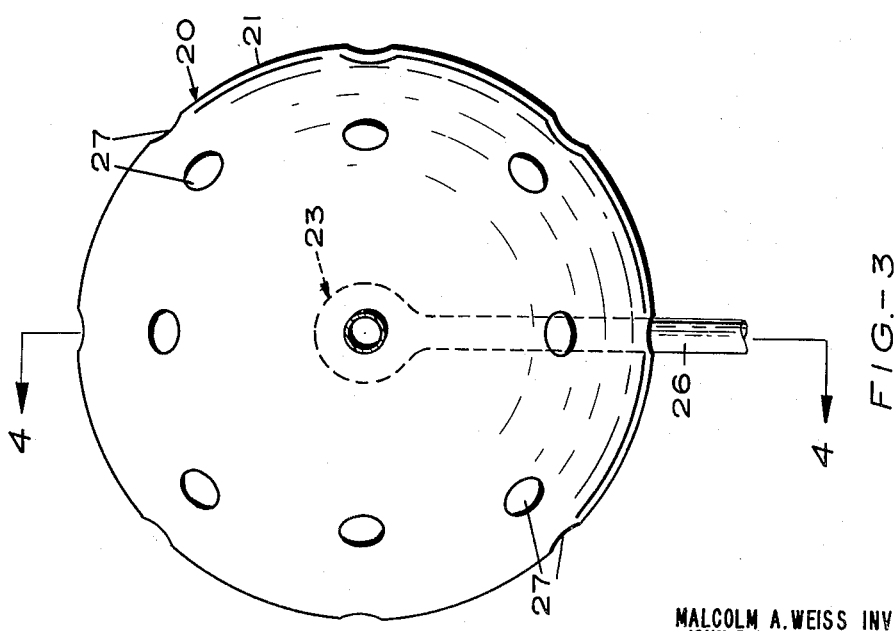
FIG. 3 is a front plan view of another form of combustion apparatus made in accordance with the present invention.

Referring now to FIGS. 3 and 4, reference character 20 represents another form of combustor made in accordance with the present invention. Reference character 21 designates a hollow spherical housing which comprises an outer metallic shell 22a and an inner insulating shell 22b which are similar in construction to metallic shell 12a and insulating shell 12b of FIGS. 1 and 2. Spaced within the interior of housing 21 is a smaller hollow spherical shell or housing 23 which is concentric with housing 21. Housing 23 is provided with inlet 24 and a multiplicity of outlets 25 which are preferably symmetrically spaced in the wall of housing 23. More than one inlet to housing 23 may be employed if desired but it is preferable to employ only one inlet. Connecting to housing 23 is inlet conduit 26 which communicates with the interior of housing 23 by means of inlet 24. The diameter of conduit 26 is preferably substantially smaller than the diameter of housing 23 so as to provide maximum uniform distribution of the fuel-air mixture through the periphery of housing 23. Inlet conduit 26 is aligned along a common radius of housings 21 and 23 and passes through housing 21. Inlet conduit 26 is attached to metallic shell 22a of housing 21 so as to provide support for itself as well as for housing 23. Inlet conduit 26 and housing 23 are constructed of a metal or alloy such as molybdenum, chromium, etc. which are capable of withstanding temperatures between about 2000–3000° F. However, if the materials of reaction are non-corrosive and the metal temperatures do not exceed about 1000° F., carbon steel may be utilized. Housing 21 is provided with a multiplicity of symmetrically spaced outlets 27 in the wall thereof. The form of combustor in the specific embodiment shown in FIGS. 3 and 4 has twenty such outlets. Jet 28 and spark device 29 are provided for initially igniting combustor 20.

In the operation of this particular form of the invention fuel is vaporized and mixed in proper proportions with an oxygen-containing gas and the mixture is then introduced into the interior of housing 23 by means of inlet conduit 26 and inlet 24 of housing 23. The fuel-air mixture in housing 23 is then uniformly distributed through the symmetrically arranged outlets 25 of housing 23 into a combustion zone existing between the exterior of housing 23 and the interior of housing 21. Outlets 25 of housing 23 thus actually provide a plurality of inlets for introducing the fuel-air mixture to the combustion zone. The ignition of this fuel-air mixture in combustor 20 is accomplished by means of a burning stream of hydrogen from jet 28 which has been ignited by spark device 29. The hydrogen flame is introduced into one of outlets 27 in housing 21. The hot gaseous products of combustion leave the combustion zone by means of outlets 27 in the wall of housing 20.

It will be noted that both combustor 10 and combustor 20 are provided with a plurality of inlets for introducing the fuel-air mixture into the combustion zone. However, combustor 20 accomplishes this result with one inlet conduit and does not require separate conduits for each inlet as does combustor 10. In the case of combustor 20, the number of these inlets to the combustion zone is thus limited only by the diameter of the inlets (actually outlets 25 of housing 23) and the surface area of housing 23. It is preferable to space outlets 27 in the wall of housing 21 symmetrically and to employ a large number of such outlets to provide the necessary outlet area. An outlet area in the wall of housing 21 should be selected which will permit combustion products to be released readily while at the same time providing a pressure drop of at least a few inches of water, so as to uniformly exhaust the gaseous combustion products through all of outlets 27. The outside diameter of housing 23 should preferably be between about 1/10 to 1/3 the inside diameter of housing 21 which is the same as the inside diameter of insulating shell 22b.

Combustor 20 may be employed similarly to combustor 10 shown in FIGS. 1 and 2 for evaporation of liquids. In this application a prevaporized fuel which has been premixed with air may be introduced into housing 23 and distributed uniformly therefrom through outlets 25 into the interior of housing 21 and ignited by means of jet 28 and spark device 29. The ignited combustor then is immersed beneath the surface of the liquid which is to be evaporated or concentrated.

Referring now to FIG. 5, reference character 30 designates a hollow spherical housing similar in construction to housing 11 of FIGS. 1 and 2. Housing 30 thus comprises a metallic shell and an insulating shell which is enclosed by the metallic shell. The interior of housing 30 provides a zone for conducting chemical reactions. If the temperature in this reaction zone does not exceed about 800–1000° F., a metallic shell only may be employed and the inner insulating shell may be omitted. Housing 30 is provided in this particular embodiment of the present invention with six symmetrically spaced inlets 31 and a multiplicity of preferably symmetrically spaced outlets 34 in the wall thereof. In this particular embodiment of the present apparatus, two gaseous streams are separately introduced into the interior of housing 30. One of these gas streams enters through one half of inlets 31 by means of inlet conduits 32 which connect to a common inlet conduit 33 and the other gas stream enters the remaining one half of inlets 31 by means of inlet conduits 35 which connect to a common inlet conduit 36. If no preheating of the gaseous stream in line 33 is required, this gaseous stream may be passed through conduit 33a by opening valve 38 and closing valve 39. However, if preheating of the gaseous stream in conduit 33 is required such preheating may be effected by heater 37 by closing valve 38 and opening valve 39 so that the gaseous stream flows through conduit 33b. Similarly, if the gaseous stream passing through conduit 36 does not require preheating, it may be passed through conduit 36a by opening valve 41 and closing valve 42. If preheating of this gaseous stream is required, it may be passed through conduit 36b by closing valve 41 and opening valve 42 so that the material is heated by heater 40. Heaters 37 and 40 may employ steam, electric coils, hot gases or any other well-known heating media for heating the gaseous streams. The rate of flow of the gaseous material in line 33 is measured by measuring device 43 and controlled by regulating valve 44 in conduit 33. Similarly the rate of flow of gaseous material in conduit 36 is measured by means of measuring device 45 and regulated by means of regulating valve 46 in conduit 36. It is to be understood that this form of the present invention is not solely restricted to gaseous materials, as the present apparatus may be utilized with any combination of phases. In many applications the materials will be in a gaseous state, being either gaseous at atmospheric conditions or being a prevaporized liquid. However, the apparatus of the present invention may be utilized, for example, for alkylation, polymerization, isomerization, etc., reactions as well as for catalyst regeneration wherein carbonaceous deposits are burned off of a finely divided catalyst material employed in a hydrocarbon conversion process.

The apparatus shown in FIG. 5 thus provides a means of separately introducing reactants without premixing prior to their introduction into the interior of housing 30. Upon the entrance of the gaseous materials into housing 30, they are vigorously and almost instantaneously mixed due to the jetting action of inlets 31. By carefully controlling the combined flow rates of the two gaseous streams, the residence time of the gaseous materials in the reaction zone in the interior of housing 30 may be accurately controlled. Also by carefully regulating the amount of heating done in heaters 37 and 40 the temperature in the reaction zone may be accurately controlled. The products from the reaction zone in the interior of housing 30 are discharged therefrom through the plurality of preferably symmetrically spaced outlets 34 in the wall of housing 30 into a zone surrounded by vessel 47. Vessel 47 is provided with a plurality of water sprays 48 for quenching the reaction products leaving housing 30 and entering vessel 47. The sprays of water are uniformly directed at the exterior of housing 30 and may impinge directly on housing 30. In the case of high temperature reactions, the thickness of the insulating shell of housing 30 should be sufficient to prevent substantial cooling of the material in the interior of housing 30 by water sprays 48. When using water sprays 48, rapid cooling and dilution of the reaction products is accomplished to thereby immediately stop the chemical reaction so as to obtain desired products from the reaction. These products are withdrawn from vessel 47 by means of conduits 49 and 50.

Specifically the apparatus shown in FIG. 5 may be utilized in one application for cracking of hydrocarbons to convert these hydrocarbons to lower boiling components. In this particular application hydrocarbon gas oil for example is introduced into conduit 33 and passed through conduit 33b to heater 37. In heater 37 the hydrocarbons are heated sufficiently to vaporize them, but normally not sufficiently to raise them to their cracking temperature. The heated hydrocarbon vapors are then introduced into the interior of housing 30 by means of inlet conduits 32 and one half of inlets 31 in the wall of housing 30. Simultaneously, an inert gas such as nitrogen is introduced through conduit 36 such that all of the inert gas passes through conduit 36b. In passing through conduit 36b the inert gas is heated to a high temperature by means of heater 40. The heated inert gas is then introduced into the interior of housing 30 by means of inlet conduits 35 and the other half of inlet conduits 31. The inert gas is heated in heater 40 sufficiently to provide the heat required for cracking the hydrocarbon vapors. The relative amount of each gaseous stream is determined by means of measuring devices 43 and 45 and is regulated by means of regulating valves 44 and 46. The hydrocarbon vapors are vigorously mixed with the incoming hot inert gas in the interior of housing 30 so that the hydrocarbon vapors are almost instantaneously brought to their cracking temperature. The products of the cracking reaction leave the reaction zone in the interior of housing 30 through outlets 34 and are immediately quenched by water from water sprays 48 of vessel 47. By controlling the relative feed rates of the hydrocarbon vapor and the inert gas, and the total rate of the combined streams, the residence time and degree of cracking in the reaction zone in the interior housing 30 may be regulated. Instead of using a hot inert gas to crack the hydrocarbons, steam may be employed to effect a steam cracking operation so as to produce a relatively high proportion of olefins and diolefins. In this type of cracking operation, it is desirable to closely control the extent of reaction so as to maximize the proportion of desired reaction products.

In another specific application of the present invention, methane and oxygen are similarly combined to effect a partial oxidation of the methane to produce acetylene as a major product of this reaction. Methane is introduced through inlet conduits 32 and one half of inlets 31 into the interior of housing 30 and oxygen is simultaneously introduced into the interior of housing 30 by means of inlet conduits 35 and the other half of inlets 31. If desired methane may be preheated by passing it through heater 37 in conduit 33b and the oxygen may be preheated by introducing it into heater 40 in conduit 36b. The relative rate of introduction of each component into housing 30 is controlled by regulating valves 44 and 46 and is measured by measuring devices 43 and 45. Upon introduction of the reactants into the reaction zone in interior of housing 30 through inlets 31, the reactants are almost instantaneously mixed. The products of the chemical reaction are withdrawn from the interior of housing 30 by means of outlets 34 and immediately quenched with water from water sprays 48 of vessel 47. By regulating the relative rates of introduction of the separate reactants and the total rate of the combined reactants to the interior of housing 30, the residence time and extent of reaction in the reaction zone in the interior housing 30 may be regulated.

Another example of a process which may be conducted effectively with the apparatus of the present invention is a partial dehydrogenation of hydrocarbons. For example, butane may be partially dehydrogenated to produce butene and butadiene. In this process it is important to closely control the reaction to obtain the desired products. It is essential in these types of chemical reactions that the residence time be accurately controlled so as to prevent the reaction from producing undesirable products. The present apparatus therefore provides a convenient means for effecting such chemical reactions as have been described. These types of chemical reactions may be termed "partial chemical reactions" because by changing the residence time in the reaction zone the extent of chemical reaction may be varied.

What is claimed is:

1. An apparatus for carrying out chemical reactions such as combustion which comprises a first hollow spherical housing characterized by a multiplicity of openings symmetrically spaced throughout substantially the entire wall thereof, a second hollow spherical housing having an inside diameter 3 to 10 times as great as the outside diameter of said first housing and substantially concentrically disposed thereabout whereby a reaction zone is defined between said first and second housings, said second housing being characterized by a multiplicity of openings symmetrically spaced throughout substantially the entire wall thereof, and at least one conduit for conducting reactive and reaction sustaining materials toward said reaction zone, said conduit passing through the wall of said second housing and communicating with the interior of said first housing.

2. An apparatus wherein a chemical reaction such as combustion is effected between reactive and reaction sustaining materials in a short controlled contact time which comprises a hollow spherical housing characterized by a multiplicity of openings symmetrically spaced throughout substantially the entire wall thereof, means external to said housing for separately preheating said reactive and reaction sustaining materials, means for separately conducting said preheated reactive and reaction sustaining materials to the interior of said housing through a plural number of said openings less than half the total number thereof but themselves symmetrically spaced throughout substantially the entire wall of said housing leaving more than half said total number of openings symmetrically spaced thereamong through which products of said chemical reaction may issue from the interior of said housing, means for regulating the rate of introduction of each of said reactive and reaction sustaining materials to the interior of said housing, and means for quenching said chemical reaction products immediately upon their issuing from said housing to prevent further reaction therebetween.

3. An apparatus wherein thermal cracking of hydrocarbons by hot inert gas is effected in a short controlled contact time which comprises a hollow spherical housing characterized by a multiplicity of openings symmetrically spaced throughout substantially the entire wall thereof, means external to said housing for separately preheating said hydrocarbons and said inert gas, means for separately conducting the resultant vaporous hydrocarbons and hot inert gas from said preheating means to the interior of said housing through a plural number of said openings less than the total number thereof but themselves symmetrically spaced throughout substantially the entire wall of said housing leaving a plural number of said total number of openings symmetrically spaced thereamong through which hydrocarbon products of said thermal cracking may issue from the interior of said housing, and means for quenching said thermal cracking products immediately upon their issuing from said housing to prevent further cracking thereof.

4. An apparatus for carrying out chemical reactions such as combustion which includes a hollow spherical housing characterized by an outer shell comprising a metallic material, an inner shell comprising a thermal insulating material enclosed by said outer shell to form a multi-layer housing wall, and a multiplicity of openings symmetrically spaced throughout substantially the entire wall formed by said inner and outer shells, and a multiplicity of conduits for conducting reactive and reaction sustaining materials to the interior of said housing communicating with said interior through a plural number of said openings, said plural number being at least two less than the total number of said openings and themselves symmetrically spaced throughout substantially the entire wall of said housing.

5. An apparatus for carrying out chemical reactions such as combustion which includes a first hollow spherical housing characterized by an outer shell comprising a metallic material, an inner shell comprising a thermal insulating material enclosed by said outer shell to form a multi-layer housing wall, and a multiplicity of openings symmetrically spaced throughout substantially the entire wall formed by said inner and outer shells, a second hollow spherical housing having an outside diameter less than the inside diameter of said first housing and substantially concentrically disposed therewithin whereby a reaction zone is defined between said first and second housings, said second housing being provided with a multiplicity of openings symmetrically spaced throughout substantially the entire wall thereof, and at least one conduit for conducting reactive and reaction sustaining materials toward said reaction zone, said conduit passing through the wall of said first housing and communicating with the interior of said second housing.

6. An apparatus for carrying out chemical reactions such as combustion according to claim 5 in which the outside diameter of said second hollow spherical housing is $\frac{1}{10}$ to $\frac{1}{3}$ of the inside diameter of said first hollow spherical housing.

7. A method of carrying out chemical reactions such as combustion which comprises introducing reactive and reaction sustaining materials into a spherical reaction zone as a multiplicity of streams symmetrically arranged around substantially the entire periphery of said zone, and withdrawing reaction products from said zone as a multiplicity of streams symmetrically arranged around substantially the entire periphery of said zone among said streams of reactive and reaction sustaining materials.

8. An apparatus for carrying out chemical reactions such as combustion which comprises a hollow spherical housing provided with a multiplicity of conduits extending outwardly from and symmetrically spaced throughout substantially the entire wall thereof and communicating with the interior of said housing, said spherical housing throughout substantially its entire wall intermediate said conduits being characterized by a multiplicity of symmetrically spaced openings wherethrough products of a chemical reaction occurring in the interior of said housing may issue with the sum of the cross sectional areas of said conduits and the openings intermediate said conduits being between 2% and 50% of the peripheral area of the interior of said housing and the sum of the cross sectional areas of said conduits being between 1% and 50% of the cross sectional areas of said openings there intermediate, and means for introducing reactive and reaction sustaining materials into the interior of said housing through said conduits.

9. A method of carrying out chemical reactions such as combustion which comprises introducing reactive and reaction sustaining materials into a spherical reaction zone as a multiplicity of streams symmetrically arranged around substantially the entire periphery of said zone, and withdrawing reaction products from said zone as a multiplicity of streams symmetrically arranged around substantially the entire periphery of said zone among said streams of reactive and reaction sustaining materials, the number of said streams of reaction products withdrawn from said zone being substantially greater than the number of said streams of reactive and reaction sustaining materials introduced into said reaction zone.

10. A method of carrying out chemical reactions such as combustion which comprises introducing reactive and reaction sustaining materials into a reaction zone having inner and outer substantially concentric spherical boundaries as a multiplicity of streams directed radially into said zone and outwardly from the center thereof and arranged symmetrically around substantially the entire interior periphery of said zone, and withdrawing reaction products from said zone as a multiplicity of streams arranged symmetrically around substantially the entire outer periphery thereof.

11. A method of carrying out chemical reactions such as combustion according to claim 10 which includes the step of introducing said reactive and reaction sustaining materials to the region within said inner boundary as at least one stream from a source external to said outer boundary.

12. A method of carrying out chemical reactions such as combustion according to claim 10 which includes the step of quenching said reaction products immediately upon withdrawing them from said reaction zone to prevent further reaction therebetween.

References Cited in the file of this patent

UNITED STATES PATENTS

| | | |
|---|---|---|
| 834,257 | Brunler | Oct. 30, 1906 |
| 2,299,849 | Rees | Oct. 27, 1942 |
| 2,395,406 | Goddard | Feb. 26, 1946 |
| 2,523,656 | Goddard | Sept. 26, 1950 |
| 2,536,599 | Goddard | Jan. 2, 1951 |
| 2,657,917 | Stanton | Nov. 3, 1953 |
| 2,701,756 | Eastman et al. | Feb. 8, 1955 |
| 2,777,813 | Totzek | Jan. 15, 1957 |